(12) United States Patent
Kwon

(10) Patent No.: US 6,208,099 B1
(45) Date of Patent: Mar. 27, 2001

(54) TECHNIQUE FOR CONTROLLING CURRENT LIMITER OF MOTOR

(75) Inventor: Young-Ki Kwon, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/385,029

(22) Filed: Aug. 30, 1999

(30) Foreign Application Priority Data

Sep. 12, 1998 (KR) .................................................. 98/37670

(51) Int. Cl.[7] ........................................................ H02P 7/00
(52) U.S. Cl. ........................ 318/432; 318/434; 388/903; 361/31
(58) Field of Search .................................... 318/432, 434; 388/903; 361/31

(56) References Cited

U.S. PATENT DOCUMENTS

| | | | |
|---|---|---|---|
| 3,935,520 | * 1/1976 | Johnson, III | 318/332 |
| 3,947,738 | * 3/1976 | Oliver | 318/341 |
| 4,433,370 | * 2/1984 | Karadsheh et al. | 363/124 |
| 4,544,868 | * 10/1985 | Murty | 318/254 |
| 5,303,156 | * 4/1994 | Matsuoka et al. | 367/424.05 |
| 5,825,597 | * 10/1998 | Young | 361/31 |

* cited by examiner

Primary Examiner—Robert E. Nappi
Assistant Examiner—Rita Leykin
(74) Attorney, Agent, or Firm—Robert E. Bushnell, Esq.

(57) ABSTRACT

An apparatus for controlling a current limiter of a motor for protecting the motor by limiting the amount of electric current supplied to the motor and controlling a driving force of the motor comprises of: a frequency detector for detecting the rotational frequency of the motor; a limiter controller for generating a current limiter control signal corresponding to the rotational frequency detected by the frequency detector; and a current limiter for limiting the amount of current supplied to the motor by the current limiter control signal. The current limiter of the motor is controlled by a pulse-width modulated signal in which the duty cycle changes, i.e., a PWM signal, according to the rotational speed of the motor so that a load state or deviation of an axial load of the motor is minimized to accurately control the motor.

16 Claims, 5 Drawing Sheets

TECHNIQUE FOR CONTROLLING CURRENT LIMITER OF MOTOR

CLAIM OF PRIORITY

This application makes reference to, incorporates the same herein, and claims all benefits accruing under 35 U.S.C. §119 from my application APPARATUS AND METHOD OF CONTROLLING CURRENT LIMITER OF MOTOR filed with the Korean Industrial Property Office on Sep. 12, 1998 and there duly assigned Serial No. 37670/1998.

BACKGROUND OF THE INVENTION

1. Field of the Invention

The present invention relates to a motor controlling technique, and more particularly, to a technique for controlling a current limiter of a motor for limiting current supplied to the motor by controlling the current limiter according to the rotational speed of the motor so that accurate control of the motor according to the type of execution mode is possible.

2. Description of the Related Art

In general, a motor controlling apparatus uses a current limiter to protect the motor from overcurrent. The current limiter limits current supplied to the motor according to a voltage supplied to a control port. That is, the current limiter cuts off the current supplied to the motor when a voltage under a threshold value is supplied to the control port. When a voltage over the threshold value is supplied, the current limiter increases the current supplied to the motor in proportion to the level of the supplied voltage.

According to conventional technology, since a uniform voltage level is supplied to the control port of the current limiter, the current supplied to the motor is limited to a particular value regardless of the type of execution mode.

In a VCR, a slow playback mode, which is one of a group of special playback modes, is for displaying an image more slowly than a normal playback mode, which is accomplished by periodically repeating a still mode and the normal playback mode. When the slow playback mode is executed by repeating the normal playback mode and the still mode, control of a brake in the motor is needed. Control of the brake is generally performed by supplying a reverse voltage to the motor for a predetermined time to reduce the speed of the motor so that a tape runs for a predetermined time and the motor comes to a stop. In this state, since the motor stops out of a target position according to a load, characteristic picture motion in a screen is not displayed smoothly.

SUMMARY OF THE INVENTION

To solve the above problem, it is an object of the present invention to provide a technique for controlling a current limiter of a motor by controlling the amount of current which is limited by the current limiter according to the rotational speed of the motor according to a playback mode so that accurate control of the motor is possible.

Accordingly, to achieve the above object, there is provided an apparatus for controlling a current limiter of a motor for protecting the motor by limiting the amount of electric current supplied to the motor and controlling a driving force of the motor, which comprises: a frequency detector for detecting the rotational frequency of the motor; a limiter controller for generating a current limiter control signal corresponding to the rotational frequency detected by the frequency detector; and a current limiter for limiting the amount of current supplied to the motor in accordance with the current limiter control signal.

To achieve another aspect of the object of the present invention, there is provided a method of controlling a current limiter of a motor for protecting the motor by limiting the amount of current supplied to the motor according to a current limiter control signal and controlling the driving force of the motor, which is achieved by (A) setting a duty cycle value $D_0$ of a pulse width modulation signal which is the current limiter control signal for each mode, (B) determining whether the present execution mode corresponds to a mode for altering a limit amount of current of the current limiter, (C) detecting a rotational frequency $f_c$ of the motor, and (D) if it is determined in step (B) that the present execution mode is the mode for altering the limit amount of current, altering $D_0$ set in step (A) according to the value of $f_c$.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
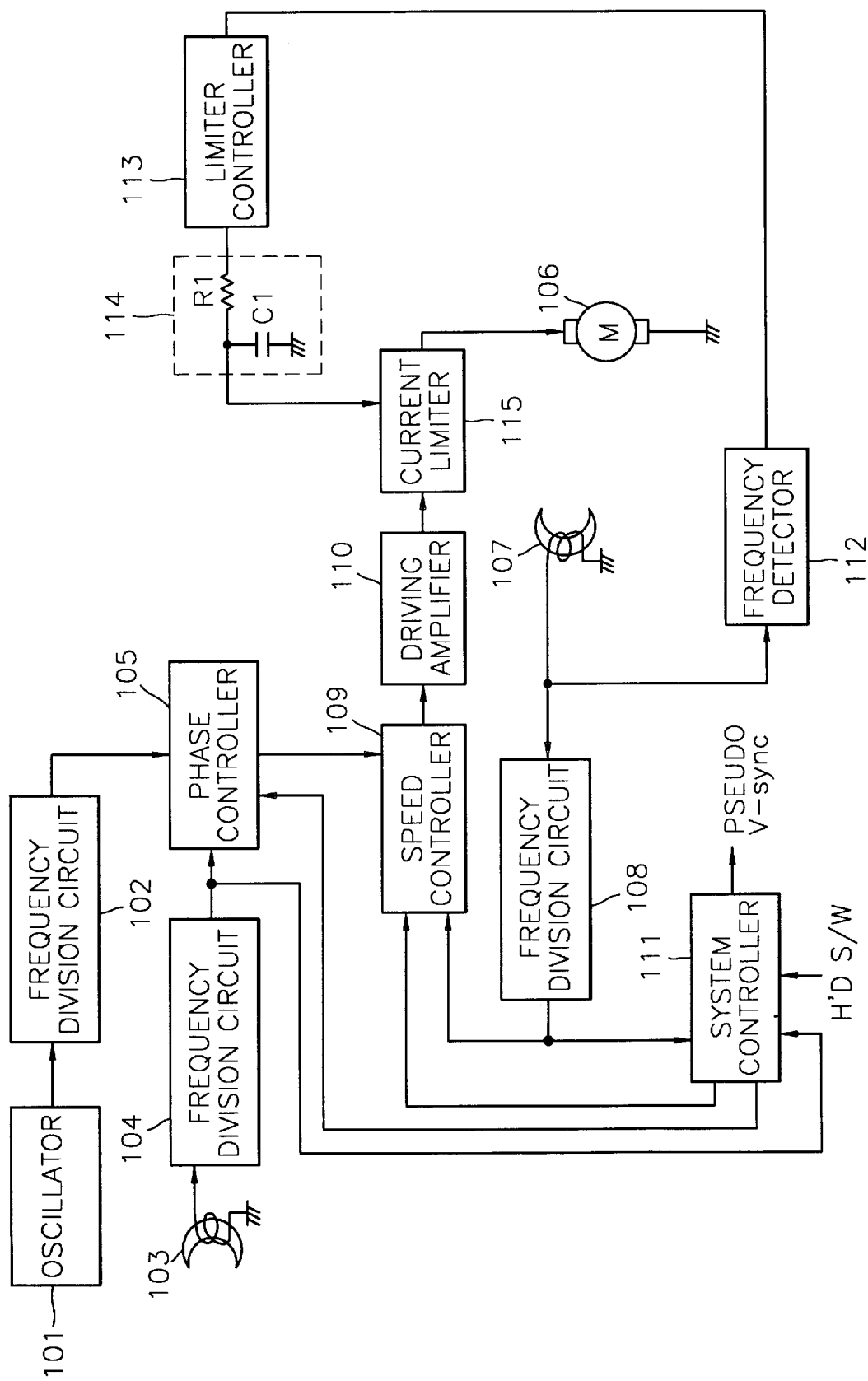
FIG. 1 is a block diagram showing the structure of a capstan motor servo of a VCR adopting a current limiter according to the present invention.

FIG. 1 shows the structure of a capstan servo block of a VCR adopting a current limiter of the present invention. Referring to the drawing, the capstan servo block includes an oscillator 101, frequency division circuits 102, 104, and 108, a control head 103, a phase controller 105, a capstan motor 106, a C.FG (capstan frequency generator) signal generator 107, a speed controller 109, a driving amplifier 110, a system controller 111, a frequency detector 112, a limiter controller 113, a low pass filter 114, and a current limiter 115.

The C.FG signal generator 107 included in the capstan motor 106 generates a signal (a C.FG signal) having a frequency corresponding to the rotational speed of the capstan motor. The speed control of the capstan motor in a normal playback mode is executed using the C.FG signal.

The method of controlling the speed of the capstan motor is described as follows.

The C.FG signal is converted to a rectangular waveform signal by the frequency division circuit 108. The speed controller 109 delays the C.FG rectangular waveform signal and generates a trapezoidal pulse maintaining a predetermined timing relation with the C.FG signal using the delayed C.FG rectangular waveform signal. A voltage proportional to the pulse width of the C.FG rectangular waveform signal is sampled from the trapezoidal pulse and, by holding the sampled voltage and outputting the same to the driving amplifier 110, the speed of the capstan motor 106 is controlled.

The method of controlling the phase of the capstan motor in a normal playback mode is described as follows.

An oscillation signal output from the oscillator 101 is divided by the frequency division circuit 102 and input to the phase controller 105. A control signal detected by the control head 103 is divided by the frequency division circuit 104 and input to the phase controller 105.

The divided oscillation signal is used not only for the phase control of the capstan motor 106 but also the phase control of a drum motor. Thus, the divided oscillation signal uniformly maintains the relative position of a tape driven by the capstan motor and a video head.

In the phase controller 105, a trapezoidal pulse is generated from a rising (or falling) edge of the divided oscillation signal and the control signal is divided to generate a sampling pulse. Then, the trapezoidal pulse is sampled according to the sampling pulse and, by holding the sampled voltage, an error voltage which is a differential voltage from a reference voltage is output to the speed controller 109.

In the speed controller 109, the control of speed is performed by using the sampled and held voltage generated from a capstan motor speed control loop. Also, the phase of the capstan motor 106 is controlled by adding the error voltage generated from the phase controller 105 to the voltage for speed control. The error voltage output from the speed controller 109 is converted by the driving amplifier 110 to a motor driving voltage and current and applied to the current limiter 115.

In the frequency detector 112, the frequency of the C.FG signal output from the C.FG signal generator 107 is detected and output to the limiter controller 113. Then, in the limiter controller 113, a pulse width modulation (PWM) type current limiter control signal, in which the duty cycle of a pulse is altered according to the frequency of the C.FG signal, is generated by a control function set according to an execution mode. The PWM type current limiter control signal is rectified by the low pass filter 114 and is output to the current limiter 115.

Accordingly, the current limiter 115 receiving the driving voltage output from the driving amplifier 110 limits the amount of current supplied to the capstan motor 106 according to the rectified limiter control signal. That is, the operation of the motor 106 can be accurately controlled by limiting the amount of current supplied to the motor 106 by the current limiter 115 according to the rotational speed of the motor 106.

Figure 2:
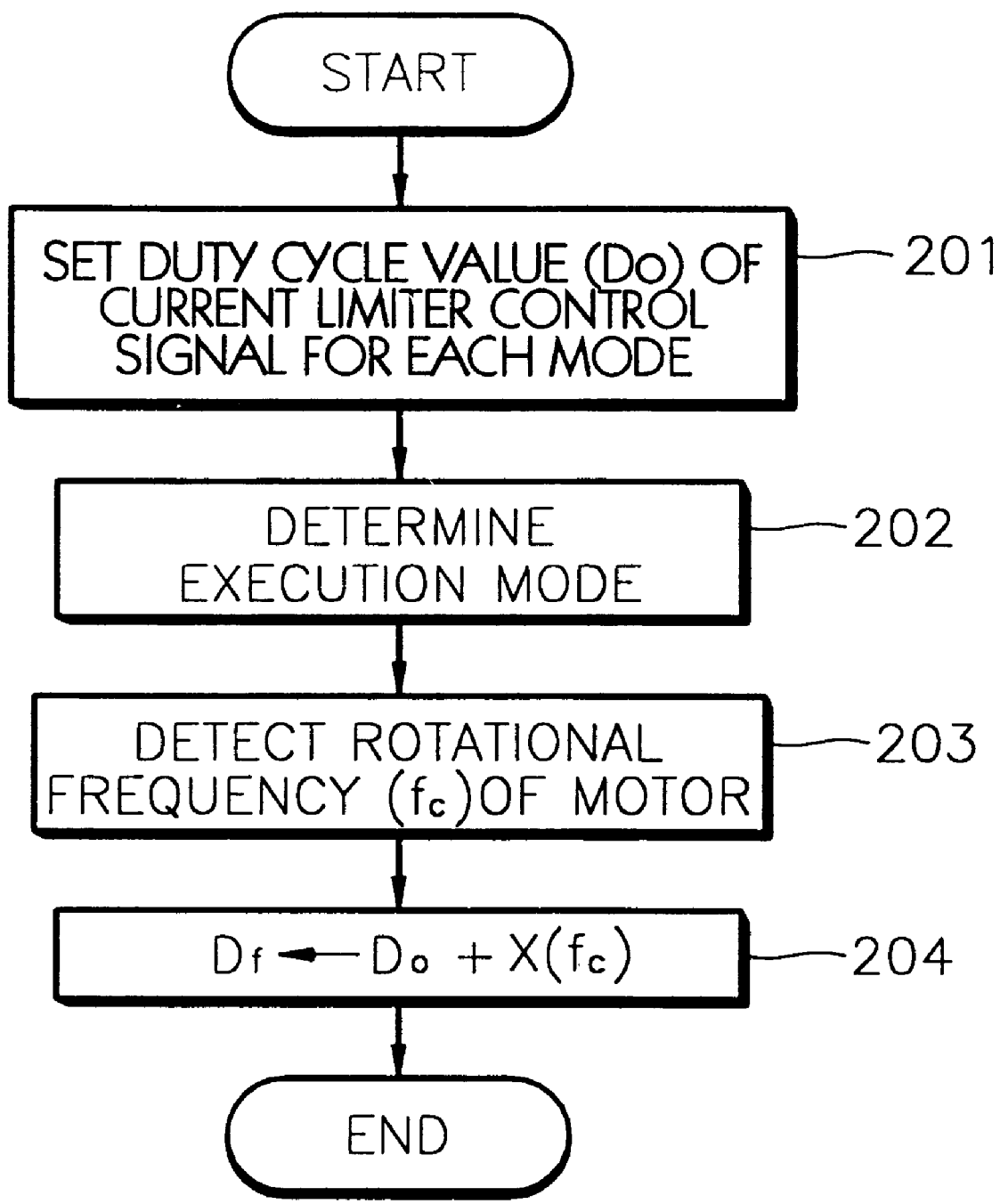
FIG. 2 is a flowchart for explaining a method of controlling a current limiter of a motor according to the present invention.

Referring to the flowchart of FIG. 2, a method of controlling the current limiter of a motor according to the present invention will now be described.

In step 201, the duty cycle value $D_0$ of the PWM type current limiter control signal is set for each mode. In step 202, the present execution mode is determined. In step 203, the rotational frequency $f_c$ of the motor 106 is detected. For example, the rotational frequency $f_c$ of a motor is detected by determining the frequency of the C.FG signal detected by a magnetic device attached to the motor. In step 204, a PWM type current limiter control signal, in which the duty cycle of a pulse is altered according to the frequency of the C.FG signal, is generated by a control function set according to the execution mode.

Next, an example of a method of controlling the current limiter of a motor in a forward direction slow playback mode of a VCR will be described in detail.

Figure 3:
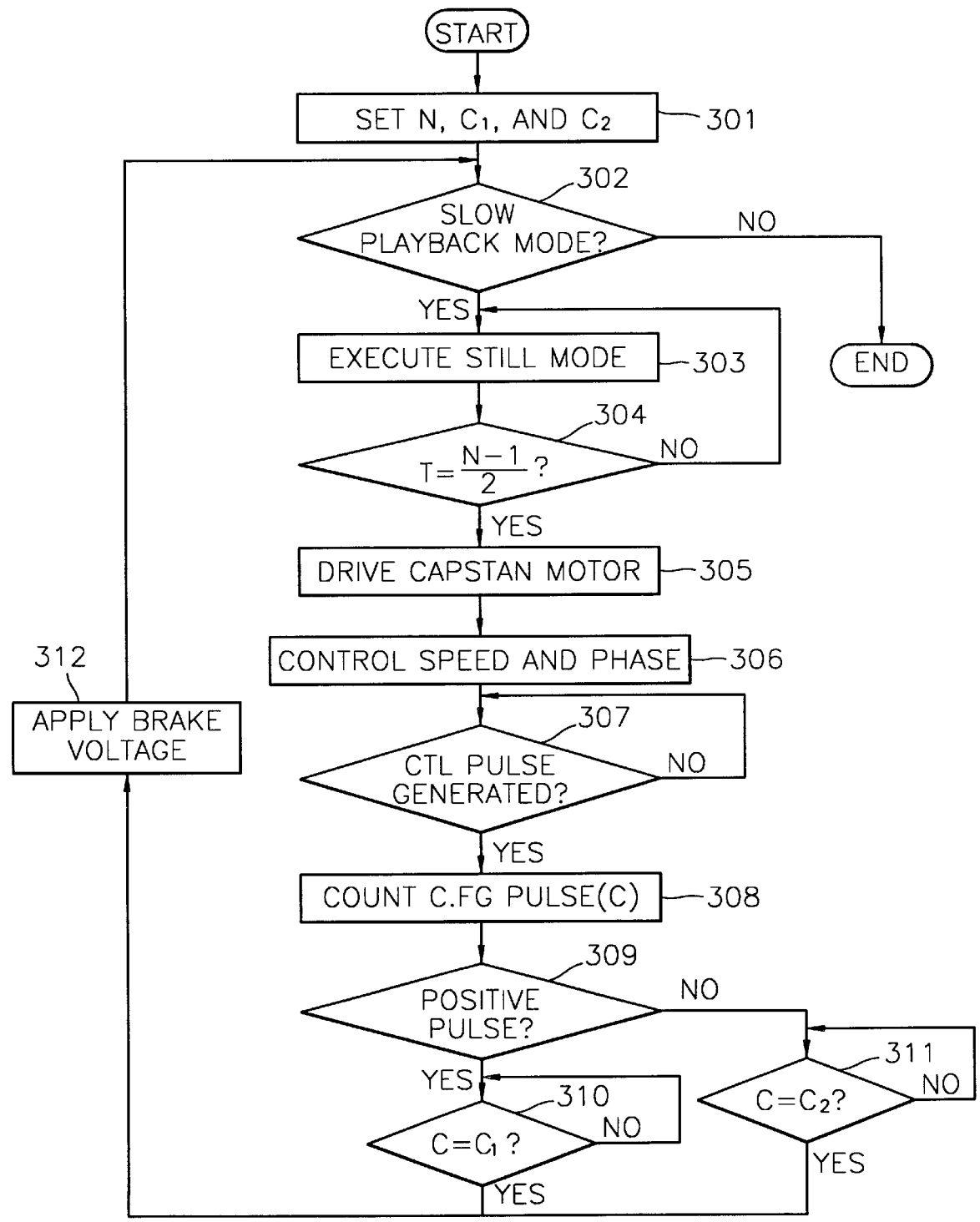
FIG. 3 is a flowchart for explaining the control of a slow playback mode in the VCR adopting the current limiter of the present invention.

FIG. 3 is a flowchart for explaining the control of a forward direction slow playback mode in the VCR.

In step 301, a speed multiple (1/N) in the slow playback mode and the number ($C_1$ and $C_2$) of the C.FG signal for moving a section for one field are initially set. Here, $C_1$ is the number of C.FG pulses occurring during ST1 (see the timing diagram (e) of FIG. 5), which is the section from a point when a positive control pulse is generated to a point when a capstan brake voltage is applied, to determine the length of one field execution section in a normal playback mode constituting the slow playback mode. $C_2$ is the number of C.FG pulses occurring during ST2 (see the timing diagram (e) of FIG. 5) which is the section from a point when a negative control pulse is generated to a point when a capstan braking voltage is applied.

In step 302, it is determined whether the present execution mode is the forward direction slow playback mode. In step 303, if it is determined that the present mode is the forward direction slow playback mode in step 302, a still mode constituting the slow playback mode is executed. In step 304, while the still mode is executed, the number of rotations T of a drum are counted and it is determined whether T is (N−1)/2. Here, a half (½) rotation of the drum corresponds to one field, and the 1/N speed slow playback mode as in the present invention is constituted by one field playback mode and (N−1) field still mode.

Figure 5:
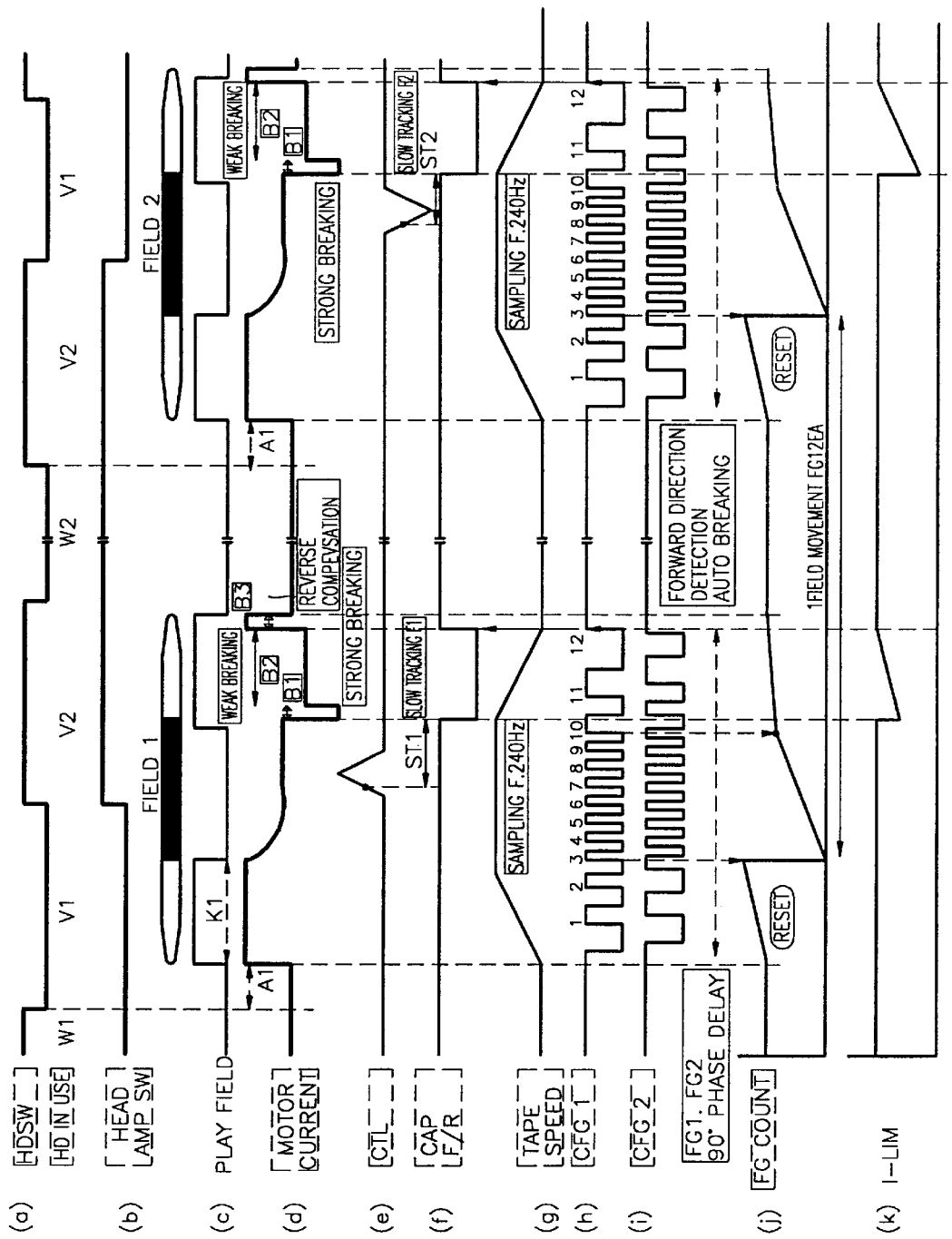
FIG. 5 is a timing diagram of major signals related to FIG. 3.

In step 305, when it is determined in step 304 that the still mode is executed such that T is (N−1)/2, the capstan motor 106 is driven to execute the playback mode for one field. In step 306, control of the speed and phase is performed, after the capstan motor 106 is driven for a period K1 shown in the timing diagram(c) of FIG. 5 instep 305. Instep 307, it is determined whether a control pulse, as in the timing diagram (e) of FIG. 5, is generated while the one field playback mode constituting the slow playback mode is executed. In step 308, if it is determined in step 307 that a control pulse is generated, a counter is operated to count the number of C.FG pulses. In step 309, it is determined whether the control pulse detected in step 307 is positive. In step 310, if it is determined that the detected control pulse is positive in step 309, it is determined whether the value C of the counter is equal to the number $C_1$ set in step 301. In step 311, if the control pulse detected in step 309 is negative, it is determined whether the value C of the counter is equal to the number $C_2$ set in step 301.

In step 312, when it is determined that the value C of the counter is equal to the number $C_1$ or $C_2$ in step 310 or step 311, respectively, as shown in timing diagrams (d) and (e) of FIG. 5, a braking voltage corresponding to a reverse voltage is supplied to stop the capstan motor 106. This is because the value of the counter corresponds to the execution of one field playback mode. In the control of the brake, strong braking is initially applied for a period B1 and weak braking is applied for a period B2. As shown in timing diagrams (h) and (i) of FIG. 5, the weak braking is applied for a second period B2 in which the phases of the C.FG1 pulse and the C.FG2 pulse change by alternating the phases of the C.FG1 pulse and the C.FG2 pulse in the forward direction and the reverse direction. Then, reverse compensation is executed for a period B3 as shown in the timing diagram (d) of FIG. 5.

After applying the capstan braking voltage to the capstan motor 106 in step 312, the system returns to step 302 and repeats from step 302 to step 312.

Figure 4:
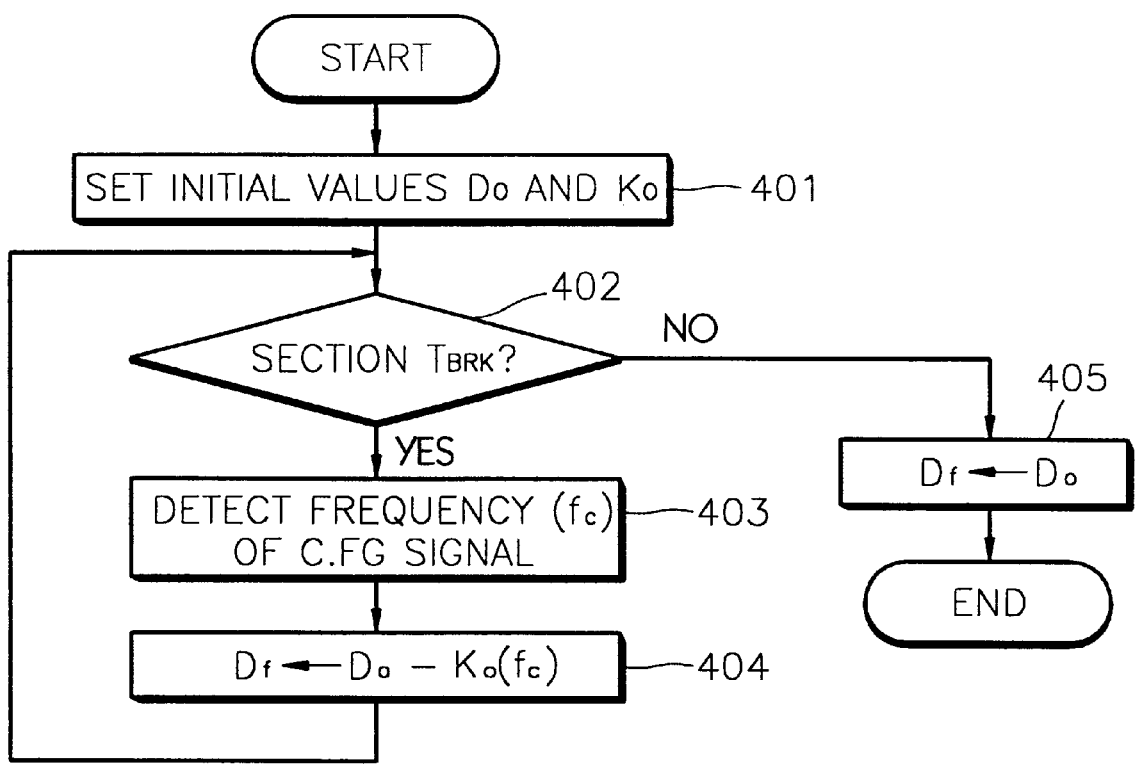
FIG. 4 is a flowchart for explaining a method of controlling a current limiter in the brake voltage application step in FIG. 3.

Step 303 and step 312 of the above steps are for applying braking voltage to a motor. A method of accurately controlling the motor by controlling the current limiter of the motor according to the present invention will be described with reference to FIG. 4.

In step 401, a PWM type duty cycle value $D_0$, which is a control signal of the current limiter, and a proportional constant $K_0$ for changing the duty according to the rotational speed of the motor in the slow playback mode, are set.

In step 402, it is determined whether it is a braking application period $T_{BRK}$ in the slow playback mode, which can be determined by using a forward direction/reverse direction control signal (CAP F/R) of the motor shown in the timing diagram of FIG. 5.

In step 403, if it is determined in step 402 to be the braking application period $T_{BRK}$, a rotational frequency of the motor, i.e., the frequency of the C.FG signal $f_c$ is detected.

In step 404, a current limit value of the motor is altered by changing the duty cycle of the PWM type current limiter control signal according to the frequency $f_c$ of the C.FG signal. That is, the pulse duty cycle of the current limiter control signal is altered in the braking application section in proportion to the rotational speed of the motor. A limit current waveform by the current limiter, altered according to the rotational speed of the motor, is shown in the timing diagram (k) of FIG. 5.

In step 405, if it is determined in step 402 not to correspond to the braking application period $T_{BRK}$, the pulse duty cycle of the current limiter control signal is determined to be the $D_0$ initially set in step 401 to control the current limiter.

According to the above braking control, the motor can be controlled to accurately stop at a desired position by limiting not only the braking application voltage but also the amount of current supplied to the motor, considering the rotational speed of the motor, in the braking application section.

According to the above operation, by altering the control voltage of the current limiter of the motor according to the rotational speed of the motor, effects due to the load condition of a deck, an axial load of the motor, or deviation in torque can be minimized so that the motor can be stopped at a desired position.

As described above, according to the present invention, the current limiter of the motor is controlled by a pulse-width modulated signal in which the duty cycle changes, i.e., a PWM signal, according to rotational speed of the motor so that a load condition or deviation of an axial load of the motor is minimized to accurately control the motor.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for controlling a motor and protecting said motor by limiting an amount of electric current supplied to said motor and controlling a driving force of said motor, comprising:

a frequency detector for detecting a rotational frequency of said motor;

a limiter controller for generating a current limiter control signal corresponding to the rotational frequency detected by said frequency detector; and a current limiter for limiting the amount of electric current supplied to said motor in accordance with said current limiter control signal;

wherein said limiter controller generates a pulse width modulation signal comprising said current limiter control signal, said pulse width modulation signal having pulses of different duty cycle according to said detected rotational frequency in accordance with a plurality of execution modes; and wherein said limiter controller determines whether a present execution mode corresponds to one of said plurality of execution modes in which a limit amount of current of said current limiter is alterable, and alters a duty cycle for said one of said plurality of execution modes when said limiter controller determines that the present execution mode does correspond to said one of said plurality of execution modes in which the limit amount of current of said current limiter is alterable.

2. The apparatus as claimed in claim 1, said current limiter control signal altering the amount of current supplied to said motor in proportion to said rotational frequency detected by said frequency detector in a braking application section.

3. A method of controlling a current limiter of a motor for protecting said motor by limiting an amount of current supplied to said motor according to a current limiter control signal and controlling a driving force of said motor, said method comprising the steps of:

(A) setting a duty cycle value $D_0$ of a pulse width modulation signal, which is said current limiter control signal, for each mode;

(B) determining whether a present execution mode corresponds to a mode for altering a limit amount of current of said current limiter;

(C) detecting a rotational frequency $f_c$ of said motor; and (D) if it is determined in step (B) that the present execution mode is said mode for altering said limit amount of current, altering the duty cycle value $D_0$ set in step (A) according to the rotational frequency $f_c$.

4. The method as claimed in claim 3, further comprising, in step (D), altering the duty cycle value $D_0$ to limit the amount of current supplied to said motor in proportion to the rotational frequency $f_c$ in a braking application section.

5. A method of controlling a current limiter of a motor for protecting said motor by limiting an amount of electric current supplied to said motor and controlling a driving force of said motor, comprising the steps of:

detecting a rotational frequency of said motor;

generating a current limiter control signal corresponding to the rotational frequency detected in said detecting step; and limiting the amount of current supplied to said motor in accordance with said current limiter control signal;

wherein said generating step comprises generating a pulse width modulation signal having pulses of different duty cycle according to said detected rotational frequency in accordance with a plurality of execution modes; and said method further comprising the steps of determining whether a present execution mode corresponds to one of said plurality of execution modes in which a limit amount of current of said current limiter is alterable, and altering a duty cycle for said one of said plurality of execution modes when it is determined, in said determining step, that the present execution mode does correspond to said one of said plurality of execution modes in which the limit amount of current of said current limiter is alterable.

6. The method as claimed in claim 5, said current limiter control signal altering the amount of current supplied to said motor in proportion to said rotational frequency detected by said frequency detector in a braking application section.

7. An apparatus for controlling a current limiter of a motor for protecting said motor by limiting an amount of current supplied to said motor according to a current limiter control signal and controlling a driving force of said motor, said apparatus comprising:

(A) setting means for setting a duty cycle value $D_0$ of a pulse width modulation signal, which is said current limiter control signal for each mode;

(B) determining means for determining whether a present execution mode corresponds to a mode for altering a limit amount of current of said current limiter;

(C) detecting means for detecting a rotational frequency $f_c$ of said motor; and (D) altering means for altering the duty cycle value $D_0$ set by the setting means according to the rotational frequency fc if the determining means determines in step (B) that the present execution mode is said mode for altering said limit amount of current.

8. The apparatus as claimed in claim 3, wherein said alters means altering the duty cycle value $D_0$ to limit the amount of current supplied to said motor in proportion to the rotational frequency $f_c$ in a braking application section.

9. In a video recording device, an apparatus for controlling a motor of said device and protecting said motor by limiting an amount of electric current supplied to said motor and controlling a driving force of said motor, said apparatus comprising:

frequency generator means associated with said motor for generating a signal corresponding in frequency to a rotational frequency of said motor;

first circuit means responsive to said signal generated by said frequency generator means for generating a motor driving signal;

second circuit means connected to said frequency generator means and responsive to said signal generated by said frequency generator means for generating a frequency detection signal;

limiter controller means connected to said second circuit means and responsive to said frequency detection signal generated by said second circuit means for generating a current limiter control signal corresponding to the rotational frequency of said motor; and current limiter means connected to said first circuit means and to said limiter controller means for limiting the amount of electric current supplied to said motor in accordance with said current limiter control signal generated by said limiter controller means and said motor driving signal generated by said first circuit means.

10. The apparatus as claimed in claim 9, wherein said first circuit means comprises a frequency division circuit for frequency-dividing the signal generated by said frequency generator means in order to provide a frequency division signal.

11. The apparatus as claimed in claim 10, wherein said first circuit means further comprises a speed controller connected to said frequency division circuit for receiving and delaying pulses of said frequency division signal so as to generate a pulse output having a timing relationship to said signal generated by said frequency generator means.

12. The apparatus as claimed in claim 11, wherein said first circuit means further comprises a driving amplifier connected to said speed controller for receiving said pulse output and amplifying said pulse output to provide said motor driving signal to said current limiter means.

13. The apparatus as claimed in claim 9, wherein said limiter controller means comprises a limiter controller connected to said frequency generator means for generating a pulse width modulation (PWM) signal having pulses of different duty cycle according to a detected rotational frequency of said motor, and a low pass filter connected to said limiter controller for rectifying said PWM signal to provide a rectified output to said current limiter means.

14. The apparatus as claimed in claim 9, further comprising third circuit means connected to said first circuit means for providing an error of voltage thereto.

15. The apparatus as claimed in claim 14, wherein said third circuit means comprises an oscillator for generating an oscillation output, and a frequency division circuit connected to said oscillator for frequency-dividing said oscillation output to generate a divided oscillation signal output.

16. The apparatus as claimed in claim 15, wherein said third circuit means further comprises a phase controller connected between said frequency division circuit and said first circuit means, and responsive to said divided oscillation signal output from said frequency division circuit for generating said error voltage signal and providing said error voltage signal to said first circuit means.

* * * * *